(12) United States Patent
Cheston, III et al.

(10) Patent No.: US 6,330,308 B1
(45) Date of Patent: Dec. 11, 2001

(54) VOICE MAIL SYSTEM FOR OBTAINING FORWARDING NUMBER INFORMATION FROM DIRECTORY ASSISTANCE SYSTEMS HAVING SPEECH RECOGNITION

(75) Inventors: Frank C. Cheston, III, Potomac; Patricia V. Hatton, Laurel, both of MD (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/057,369

(22) Filed: Apr. 9, 1998

(51) Int. Cl.[7] .................................................. H04M 1/64
(52) U.S. Cl. .................................. 379/88.04; 379/88.18; 379/88.23; 379/201
(58) Field of Search .................. 379/88.01, 88.04, 379/88.11, 88.16, 88.17, 88.22, 88.23, 88.25, 88.27, 88.28, 201, 219, 229, 230, 214; 704/270, 275

(56) References Cited

U.S. PATENT DOCUMENTS

| 4,652,700 | 3/1987 | Matthews et al. . | |
|---|---|---|---|
| 4,856,066 | * 8/1989 | Lemelson | 704/275 |
| 5,008,926 | 4/1991 | Misholi . | |
| 5,193,110 | 3/1993 | Jones et al. . | |
| 5,204,894 | 4/1993 | Darden . | |
| 5,479,488 | * 12/1995 | Lenning et al. | 379/88.04 |
| 5,518,177 | 5/1996 | Weaver et al. . | |
| 5,553,119 | 9/1996 | McAllister et al. . | |
| 5,586,177 | 12/1996 | Farris et al. . | |
| 5,631,948 | 5/1997 | Bartholomew et al. . | |
| 5,638,425 | 6/1997 | Meador, III et al. . | |
| 5,812,638 | * 9/1998 | Muller | 379/88.09 |
| 5,812,639 | * 9/1998 | Bartholomew et al. | 370/352 |
| 5,940,484 | * 8/1999 | DeFazio et al. | 379/142 |
| 6,075,844 | * 6/2000 | Goldberg et al. | 379/88.17 |

* cited by examiner

Primary Examiner—Fan Tsang
Assistant Examiner—Roland G. Foster
(74) Attorney, Agent, or Firm—McDermott, Will & Emery

(57) ABSTRACT

A voice mail system today offers a user the option to forward a message that he or she has reviewed, alone or along with a message recorded by the user. However, to forward the message, the voice mail system needs to receive the telephone number of the party intended as the recipient of the forwarded message. To eliminate the need for manual output of the destination telephone number, the voice mail system is coupled for communication with a voice responsive directory service system. The directory service system or alternatively the voice mail system prompts the user to speak the name of the party intended as the recipient of the forwarded message. The directory service system analyzes the input speech information, identifies a desired destination and retrieves the number for that destination. The directory service system may announce the number to the user, for manual input to the voice mail system. Preferably, the directory service system supplies the number directly to the voice mail system. The voice mail system uses the number to forward the message.

38 Claims, 6 Drawing Sheets

VOICE MAIL SYSTEM FOR OBTAINING FORWARDING NUMBER INFORMATION FROM DIRECTORY ASSISTANCE SYSTEMS HAVING SPEECH RECOGNITION

BACKGROUND OF THE INVENTION

1. Technical Field

The present invention relates to switched communications networks providing voice mail services, more particularly to a system and method for providing communication between voice mail systems and other electronic mail systems using directory systems having speech recognition capabilities.

2. Background Art

Voice mail has become commnonplace not only in business usage but also on an individual telephone service subscriber basis through service from a central office. A voice mail system is a specialized computer that stores messages in digital form on a disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,631,948 to Bartholomew et al., the disclosure of which is incorporated in its entirety herein by reference.

The above-incorporated Bartholomew et al. patent discloses a system and method of effecting transfer of a message such as a voice message from one centralized messaging system to another centralized messaging system in a switched communications network having a plurality of central offices connected to subscriber terminals and connected together by trunks. Specifically, the transfer of the message by one centralized messaging system is effected through a common channel signaling network using the existing advanced intelligent network (AIN) implementation of public switched telecommunications networks in the United States. The disclosed voice messaging system provides caller to remote mailbox and/or mailbox to remote mailbox communication using TCAP and SS7 messaging in the AIN while blocking or obviating trunking of voice messages. The disclosed system uses existing voice mail equipment interfaced to the telephone network and that is fully responsive to TCAP and SS7 protocols. In particular, the voice mail system communicates with a service switching point (SSP), which in combination with a centralized node in the network, such as a Service Control Point (SCP), enable AIN services to be provided for the voice mail system.

According to Bartholomew et al., a caller desiring to leave a voice message in the mailbox of a remote person may use a telephone to access his own voice mail system and mailbox and to record the message. The voice processing unit of the mailbox may operate its voice menu to direct the caller to depress a specified key when satisfied with the message. The voice processing unit may then query the caller as to whether he desires to send the message and, if so, to depress another specified key. The voice unit then may instruct the caller as to the procedure for keying in the identity of the destination and to depress a further specified key to send the message. The message is digitized in conventional fashion and stored in the mailbox of the sender. The caller may go on hook after depressing the designated send key. The depression of the send key causes the generation of a tone or other signal which is recognized by the acting SSP as an AIN trigger. This local connection ends usage of the voice network.

The trigger causes the SSP to frame a TCAP inquiry message which is directed to the SCP for instructions. The TCAP message includes information identifying the calling station and mailbox and the called station and the fact that the caller is requesting mailbox to mailbox message transfer. The SCP consults its database to establish whether the caller is authorized to communicate mailbox-to-mailbox and as to the existence and identity of a mailbox for the called number. The SCP then originates a response to the SSP to dispatch one or more SS7 packets to the called directory number and mailbox along with an appropriate routing label and handling instructions and carrying as the included information in the SS7 packet the digitized voice retrieved from the mailbox of the sender. The information may be in T1 protocol which is conventionally the output digital signal of mailbox equipment regardless of manufacture.

Known voice mail systems such as disclosed in Bartholomew et al. are well adapted to efforts to network the voice mail systems. In particular, an organization known as The Message Alliance (TMA) has attempted to establish an open standard for voice mail systems. Work is underway to develop a set of standards known as Audio Message Interchange Service (AMIS) in the hope that when AMIS standards are approved, they will form a common language that network voice mail systems can support to enable communication between voice mail systems of different manufacturers.

In particular, TMA has proposed a voice mail messaging system where a subscriber having voice mail service dials into his or her voice mail system (the originating voice mail system), records a message, and inputs the telephone number (i.e., the destination telephone number) of the called party. The originating voice mail system forwards the message and the input telephone number to a protocol translator. The protocol translator is a node connected to the public switched telephone network and that has a first connection for communication with the originating voice mail system and a second connection dedicated to communication with a centralized database. The protocol translator, implemented for example using an IBM RS 6000 system, converts the message and the corresponding telephone number from the protocol used by the originating voice mail system to a protocol compatible with the centralized database (e.g., AMIS). The protocol translator sends the converted message and telephone number to the centralized database via the second dedicated connection using, for example, an Asynchronous Transport Multiplex (ATM) transport layer.

The proposed TMA database stores telephone numbers for all voice mail boxes for all voice mail systems in the TMA network. Hence, all service providers having voice mail subscribers will have the respective voice mail box information stored in the TMA database. Upon receiving a message from the protocol translator, the TMA database will retrieve necessary information for accessing the voice mail box for the called party based on the supplied telephone number, and supply routing information back to the protocol translator. The protocol translator, using the routing information, then initiates a line-sided connection with the public switched telephone network to establish a connection with a destination node serving the voice mail system for the called party.

The above-described voice mail systems, however, suffer from the disadvantage that a user of the voice mail system must manually key in the destination telephone number for the called party. In particular, the voice processing unit of the voice mail system is configured to detect the destination telephone number based on the sequence of DTMF signals generated during touchkey inputs by the user. Although tolerable by voice mail users who have unimpeded access to a telephone list and a touch-tone pad, this arrangement is not practical for users that do not recall a destination telephone number for a desired individual, or users that prefer "hands-free" operation that avoids the use of a touch-tone pad.

This problem is readily apparent for business travelers that need to check their voice mail messages while traveling. For example, a business traveler may access his or her voice mail box for messages, and discover an urgent voice mail message from a customer. Assume the business traveler wishes to reply to the voice mail message by calling back the customer, or wishes to forward the voice mail message to a colleague to request additional information related to the urgent voice mail message. If the business traveler does not recall the telephone numbers of the colleagues (or have their telephone numbers readily available), the business traveler will need to disconnect from his or her voice mail, access the appropriate directory assistance system to obtain the telephone number of the customer and/or colleague, record the telephone number supplied by the directory assistance system (e.g., by writing the number on a sheet of paper), disconnect from the directory assistance system, and call back the voice mail box to replay the message and manually input the telephone numbers obtained from directory assistance.

This problem exists even in conventional business and residential voice mail systems, where a voice mail subscriber having a voice mailbox on a private branch exchange or computer/answering machine wishes to reply or forward a message on his or her mailbox, and does not have the destination telephone number readily available. Voice mail systems typically have a "time-out" feature, where a voice mail subscriber is disconnected if no reply to a prompt is received by the voice mail system within a prescribed interval. Hence, if the voice mail subscriber attempts to place the voice mailbox on "hold" (e.g., by pressing hook/flash on his or her desk telephone) to access a directory assistance system, there is a risk that the voice mail system will disconnect if the subscriber does not return to enter the destination telephone number within a prescribed time interval.

Hence, voice mail users suffer the inconvenience of remembering, as well as manually inputting, destination telephone numbers in order to reply to voice mail messages, or to forward the voice mail messages. The requirement of manual key inputs is not only an annoyance for voice mail users who do not have the destination telephone numbers readily available, but may also result in voice mail users putting themselves in unsafe conditions, for example if a voice mail user inappropriately attempts to use the keypad of a cellular telephone while driving a vehicle.

Personal electronic directories (PED) have been developed that enable subscribers to access personal directories. For example, U.S. Pat. No. 5,204,894 to Darden, the disclosure of which is incorporated in its entirety herein by reference, discloses a central office based service and apparatus where subscribers may call a special number from any DTMF telephone to access their personal directory. The PED provides subscribers the ability to store names and numbers through audio signals which are preferably the subscriber's voice. In particular, the PED subscriber accesses a voice response unit (VRU), and adds an entry by speaking the first four letters of the name to be stored, followed by speaking the full name, and then speaking the individual digits of the telephone number. The subscriber then may access his PED remotely from any DTMF telephone and have a requested name and number repeated back in the subscriber's own voice by spelling the first four letters of the requested name. As an option the subscriber may have the number automatically dialed.

The Darden system, however, recognizes only clearly spoken letters or numerals, as opposed to spoken names. Moreover, the personal electronic directory requires a user to input individual names and numbers: its scope is limited to those numbers and names input by the user, and does not include the telephone number listings associated with generalized directory systems.

Automated directory assistance systems have been developed that have speech recognition capabilities. Such automated directory assistance systems are beneficial in minimizing the necessity on operator intervention. Examples of automated directory assistance systems are described in U.S. Pat. No. 5,638,425 to Meador, III et al., and U.S. Pat. No. 5,553,119 to McAllister et al., the disclosures of which are incorporated in their entirety by reference. Meador, III et al. discloses a mechanized directory assistance system for use in a telecommunications network, where a caller's response is recognized using various recognition devices; once a match having a satisfactory probability level is obtained, the match is used to access a database for the corresponding telephone number.

Despite the foregoing, voice mail users having a need to obtain a destination number for an intended recipient of a voice mail message (e.g., a forwarded message) must still suspend the voice response session with the voice response unit of the voice mail system in order to obtain the destination number. Regardless of whether the subscriber uses a personalized directory (e.g., as described in Darden), a conventional operator-assisted directory assistance system, or an automated directory assistance system as disclosed in Meador, III et al. or McAllister et al., the voice mail subscriber must access the destination telephone number from the accessed directory, write down the number (or attempt to remember the number) retrieved by the directory system, and return to the voice mail system to enter the destination number.

Hence, the requirement that a voice mail user needs to obtain the desired destination telephone from the directory assistance system, followed by manual input of the destination telephone number into the voice mail system for forwarding the stored voice mail message, results in inconvenience to the voice mail user, and a greater probability of errors due to recording the wrong number or pressing the wrong key. In addition, the above systems are especially inconvenient for users who require hands-free operations.

DISCLOSURE OF THE INVENTION

There is a need for an arrangement that enables a subscriber of a voice mail system to send recorded messages to an identified called party without the necessity of remembering a called party telephone number.

There is also a need for an arrangement that enables an originating voice mail system, having a message for transmission to a called party served by a destination voice mail system, to obtain a called party telephone number for the identified called party without the necessity of the calling party recalling or inputting the called party telephone number.

There is also a need for an arrangement that enables a subscriber of a voice mail system, desiring to forward a recorded message, to access an automated directory assistance system for a called party number without risk of being disconnected from the voice mail system.

There is also a need for an arrangement that provides a voice mail system utilizing the beneficial features of automated directory assistance systems having speech recognition capabilities, without the expense of fully integrated voice mail systems having speech recognition modules integrated into the voice mail systems.

There is also a need for a voice mail system having data network capabilities to send and receive messages between automated directory assistance systems and destination voice mail systems. In particular, there is a need for a voice mail system having SS7 capabilities to send a TCAP query message via the CCS network of the public switched telephone network in order to obtain destination telephone number information from the automated directory assistance systems and routing information from a corresponding subscriber profile record for a called party, where the called party is the intended recipient of a recorded message to be sent by the voice mail system. In addition, there is a need for a voice mail system having capabilities to send messages via a TCP/IP computer network, to obtain destination telephone number information and/or routing information for forwarding a voice mail message to a destination voice mail system.

These and other needs are attained by the present invention, where a voice mail system is configured to establish a communication link with an automated directory assistance system having a speech recognition unit. The communication link enables a voice mail subscriber and/or the voice mail system to access the automated directory assistance system to identify a telephone number for a called party, identified as an intended recipient of a recorded message, while connected to the voice mail system. A voice mail subscriber can thus access a voice mail system to record or replay a voice mail message for a called party, and determine the telephone number of the called party (i.e., the destination telephone number) by automatically accessing the automated directory assistance system during the voice mail session. The called party telephone number obtained using the automated directory assistance system can then be used to transmit the recorded message to a destination voice mail system serving the called party based on the retrieved telephone number.

According to one aspect of the present invention, a voice mail system comprises a voice processing unit configured for recording a called party identity, spoken by calling party, for a recorded message, and a master control unit. The master control unit is configured for initiating a called party telephone number query routine in response to reception of the called party identity, and for establishing a link with an automated directory assistance system and supplying the called party identity to the automated directory assistance system. The master control unit, upon receiving the called party telephone number from the automated directory assistance system, uses the called party telephone number to transfer the recorded message. The voice processing unit enables a calling party to speak a called party identity, providing a more user-friendly interface when the user is unable to key in the called party telephone number, for example due to forgetting the number, or being unable to press the keys. In addition, the query routine executed by the master control unit enables the calling party to use the resources of the automated directory assistance systems while connected to the voice processing unit. Hence, the voice-mail system provides the advantages of a voice mail system integrated with automated directory assistance system, without the associated costs to the service provider.

According to another aspect of the present invention, a telecommunications network comprises a central office switching system configured for receiving a line-sided connection with a calling party and an automated directory assistance system. The automated directory assistance system comprises a speech recognition unit for identifying a directory listing based on supplied speech samples. The automated directory assistance system retrieves a stored telephone number for the identified directory listing. A voice mail system is configured for recording a called party identity for a recorded message from the calling party via the line-sided connection. The voice mail system supplies the speech samples to the automated directory assistance system based on the recorded called party identity and obtains the corresponding stored telephone number for transmission of the recorded message. Use of the speech recognition unit for identifying a directory listing enables the voice mail system to obtain the stored telephone number with minimal modification to the respective network elements. Hence, the feature of identifying called party telephone numbers for voice mail-to-voice mail transfers can be implemented in existing telephone networks with minimal modifications.

Still another aspect of the present invention provides a method in a switched communications network. The method comprises connecting a calling party in a first connection to an originating voice mail system serving the calling party and configured for storing a recorded message associated with the calling party. A called party identity spoken by the calling party that specifies a destination party for the recorded message is received, and the called party identity is identified in an automated directory assistance system using speech processing. A telephone number corresponding to the destination party is retrieved in response to identification thereof, using a second connection between the originating voice mail system and the automated directory assistance system while maintaining the first connection. The recorded message is transmitted to a destination voice mailbox serving the destination party based on the retrieved telephone number. Retrieval of the telephone number while maintaining the first connection enables the calling party to obtain the appropriate number without risk of being disconnected from the voice mail. Moreover, the second connection enables the calling party to take advantage of both systems simultaneously.

Hence, the present invention enables a voice mail system to obtain called party number information for a destination party without requiring the voice mail subscriber to initiate a separate line-sided connection in an attempt to find the telephone number.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiments are directed to a voice mail system capable of establishing a communication link with an automated directory assistance system to obtain called party telephone number information from a directory assistance system using speech recognition capabilities. The automated directory assistance system, also referred to as a voice responsive directory service system, provides voice recognition of the called party identity spoken by the user. The directory service system analyzes the input speech information, identifies a desired destination and retrieves the number for that destination. The directory service system may announce the number to the user, for manual input to the voice mail system. Alternately, the directory service system supplies the number directly to the voice mail system, enabling the voice mail system to forward the message.

Network Overview

Figure 1:
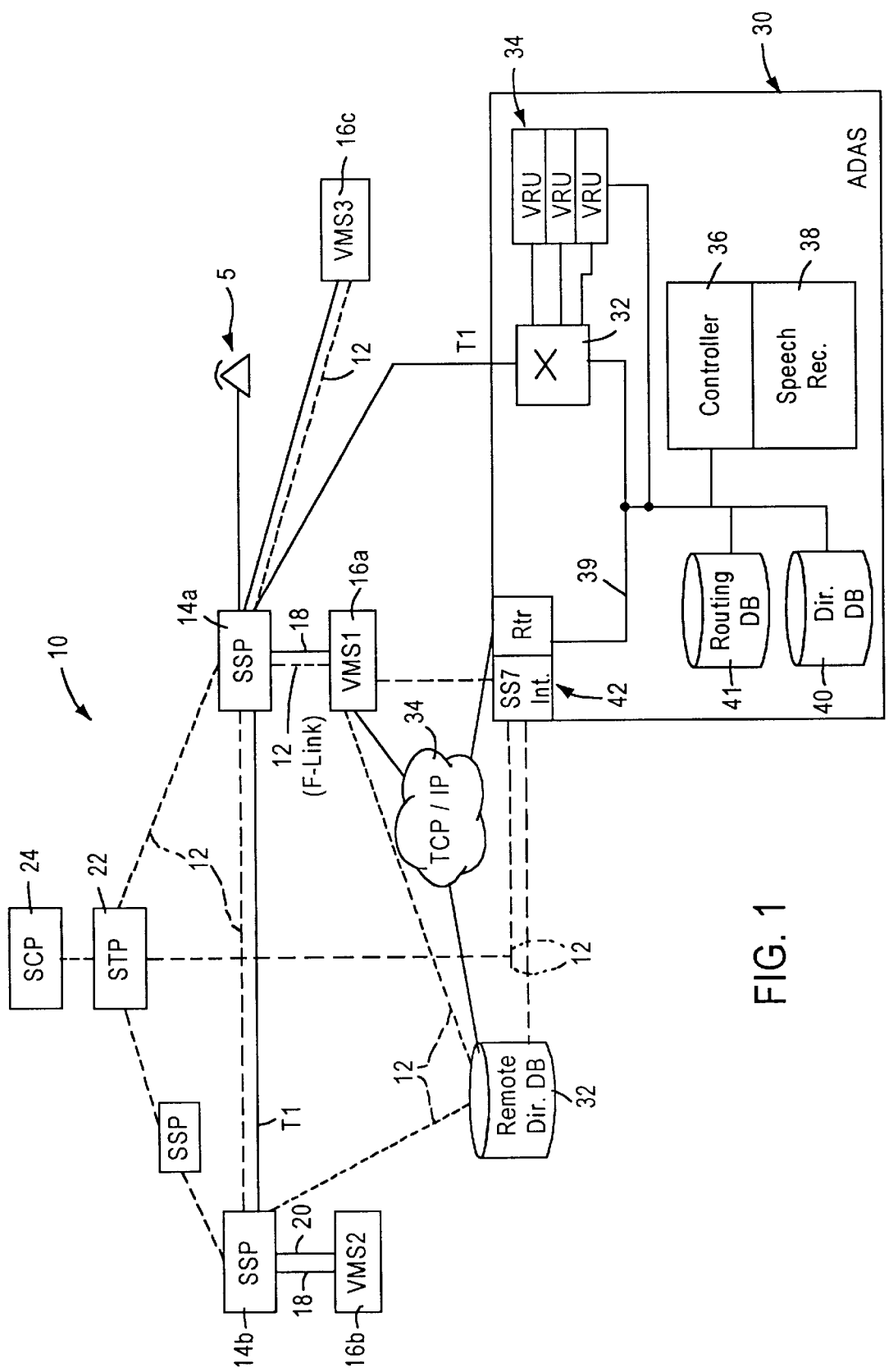
FIG. 1 is a block diagram of a telecommunications network having a voice mail system configured for communicating with an automated directory assistance system for retrieving stored telephone numbers according to an embodiment of the present invention.

FIG. 1 is a block diagram illustrating a public switched telephone network 10 and a common channel interoffice signaling (CCIS) network 12 (e.g., SS7) used to carry the signaling for the switched telephone network. The switched telephone network 10 includes a series of central offices 14, for example signaling points (SP) or service switching points (SSP). The term "signaling points" refers to central offices that do not necessarily have the requisite capabilities for performing AIN queries; as such, SPs are distinguishable from SSPs, which have AIN capabilities. Each end office switching system 14 may be a local or "end office" type switch, such as a 1AESS or 5ESS switch sold by AT&T. The telecommunications network of FIG. 1 also includes voice mail systems (VMS) 16a, 16b and 16c. As described below, the voice mail systems 16a and 16c may include signaling capabilities to send query messages and receive routing information related to recorded messages to be sent to a destination. At a minimum, the VMS 16a may receive voice calls over a multi-line hunt group (MLHG) 18 under the control of control signals communicated via the simplified message desk interface (SMDI) link 20, as shown with respect to VMS 16b.

The signaling network 12 also includes a signaling transfer point (STP) 22. Each STP in a network is connected to the SSPs, the SPs and the SS7-capable nodes by A links. The STP 22 is configured for transporting signaling messages between different signaling nodes in the SS7 network. If desired, the STP 22 may include a database for storing call processing control information. Specifically, U.S. Pat. No. 5,518,177 to Farris et al., the disclosure of which is incorporated in its entirety herein by reference, discloses an Integrated STP (ISTP) having a database storing call processing control information, which is adapted to trigger access to records within that database in response to signaling messages when certain conditions are met. Hence, the switch 14a or an SS7-capable VMS 16a can send a TCAP query message via the SS7 signaling network 12 to the STP 22, where the STP responds to the TCAP query message by supplying the necessary routing information to the originating voice mail system 16 based on the destination telephone number. Additional details regarding accessing a database within an STP 22 by an SS7-capable voice mail system are disclosed in commonly assigned, copending application Ser. No. 08/997,538, filed Dec. 23, 1997 entitled "Voice Mail System for Obtaining Routing Information from Signaling Nodes", the disclosure of which is incorporated in its entirety herein by reference.

As described above, the signaling network 10 may be implemented in various forms. For example, the signaling network 10 may be implemented as an advanced intelligent network (AIN), that includes a service control point (SCP) 24 as a centralized node in the network, used to obtain call processing information for voice mailbox transfers, described below.

AIN conventionally provides services based on feature logic and data located at a centralized node in the network, such as a Service Control Point (SCP). Appropriately equipped switches in the network, known as Service Switching Points (SSPs), communicate with the SCP and together they provide various AIN services. The SSP knows which calls require AIN service based on characteristics of the call, such as the line it originated from or the digits that were dialed. The process of identifying calls that require AIN processing is known as "triggering", since a particular characteristic of the call "triggers" to switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

As shown in FIG. 1, the telecommunications network also includes an automated directory assistance system (ADAS) 30 that includes a speech recognition unit 38 for identifying directory listings based on supplied speech samples. The automated directory assistance system 30 includes a crossconnect switch 32 for connecting incoming line-side connections from the switch 14a to one of a plurality of voice response units (VRU) 34. The switch 14a is connected to the ADAS 30 by conventional trunk lines, for example T1 lines having appropriate signaling capabilities, for example SMDI links or PRI links.

The ADAS 30 also includes a controller 36 for controlling operations of the ADAS 30. In particular, the controller 36 controls the switching of the crossconnect switch 32 to route incoming calls to an available VRU 34. The ADAS 30 also includes a speech recognition unit 38, a directory database 40 storing telephone numbers for a group of subscribers served in a prescribed region of the telephone network, a local data network 39 for transporting voice speech samples between the VRUs 34 and the speech recognition unit 38, and control and query messages to and from the controller 36, and a data network interface 42 to enable sending and receiving of data messages across a data network, for example the common channel interoffice signaling network 12. The ADAS 30 may also include a second database 41 storing routing information for other remote directory assistance systems accessible by the ADAS 30, identified by directory index entries. Alternatively, the databases 40 and 41 may be integrated into a single database.

The ADAS 30 may have varying levels of implementation. The most simplified implementation involves establishing the ADAS 30 as an intelligent peripheral, where incoming calls are processed by connecting an incoming call to one of the VRUs 34, collecting speech samples in order to identify a stored subscriber, and then announcing the corresponding telephone number retrieved from the local directory database 40. In such an arrangement, the ADAS 30 would typically disconnect the incoming call following announcement of the requested telephone number. Preferably, the ADAS 30 includes a data link interface 42 enabling the ADAS 30 to communicate with the VMS 16a by a data network, such as the common channel interoffice signaling network 12, or alternatively a packet switched data network, such as the Internet. As described below, use of the data interface 42 enables the VMS 16a and the ADAS 30 to share information, resulting in the retrieval of a telephone number by the VMS 16a in a manner that is transparent to a voice mail subscriber 5. In addition, the interface 42 enables the ADAS 30 to extend the directory assistance capabilities beyond the stored names and numbers in the directory database 40 by accessing another remote directory database 32 directly from the ADAS 30 in order to retrieve the stored telephone number, and forward the stored telephone number to the VMS 16a. Alternatively, the ADAS 30 may send a TCAP query message to the SCP to identify the appropriate remote directory database. The ADAS 30 may then access the remote directory database 30, or alternatively return routing information to the VMS 16a for accessing the remote directory database 32 having the appropriate directory telephone number. These alternative arrangements for providing the called party number (i.e., the destination telephone number) to the VMS 16a for voice mail transfer to the VMS 16b or VMS 16c are described in more detail with reference to FIGS. 4A, 4B, and 4C. As described below, the VMS 16a may utilize the SS7 network to perform the actual mailbox transfer.

SS7 Overview

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, and has typically been used for accessing AIN databases such as Service Control Points (SCPs) in Advanced Intelligent Networks, described above. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points, voice mail systems with SS7 capabilities, and databases in each network, is assigned a 9-digit point-code for purposes of addressing signaling messages through the CCIS network. Both the SCCP protocol and the MTP processing utilize these point codes. It will be helpful to consider the format of SS7 messages and particularly the routing information contained in each message.

The SS7 messages traverse the network at all times. The messages themselves comprise digital serial messages that come into the various signaling points. The first byte or octet of the SS7 message packet is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

The routing label of the SS7 message packet will now be described. The first 7 bits of octet 2 constitute the Backward Sequence Number (BSN). The eighth bit is the Backward Indicator Bit (BIB) which is used to track whether messages have been received correctly.

For example, if SSP 14a in FIG. 1 sends a message to SP 14b, SSP 14a includes a Forward Sequence Number (FSN) in the 3rd octet of its message. Upon receiving this message, SP 14b will include a Backward Sequence Number (BSN) equal to the FSN sent in the previous message in its next message to SSP 14a. This indicates to SSP 14a that SP 14b received the first message. This constitutes a positive acknowledgment of receipt of a message.

If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

SSP 14a sends a message with a FSN of 5 to SP 14b;

SP 14b transmits a message back to SSP 14a with an inverted BIB and a BSN of 2, indicating that was the last message it received;

SSP 14a then inverts its FIB and retransmits message 3;

if SP 14b acknowledges this message correctly (BSN of 3) SSP 14a will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. Specifically, octets 6–11 contain the point codes, where the destination or 'called party' address includes octets 6, 7 and 8. Octets 9–11 carry origination point code (OPC) information, for example member, cluster and network ID information.

The three octets of the called party address contain an actual destination point code (DPC) identified as DPC-member, DPC-cluster and DPC-network ID information. In operation, the translation tables stored in a transfer point such as the STP 22 or in an ISTP cause the transfer point to actually route based on the DPC without translating any of the DPC octets into new values. In the case of an ISTP, the called party address octets (6–8) may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. Under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Additional details regarding SS7 signaling are disclosed in the abovencorporated U.S. Pat. No. 5,631,948 to Bartholomew et al., and in U.S. Pat. No. 5,586,177 to Farris et al., the disclosures of which are incorporated in their entirety herein by reference.

TCP/IP Network

The VMS 16 and the ADAS 30 in FIG. 1 may alternatively be configured for communications via a TCP/IP network 34, such as the Internet. "Internet" refers to the global information system that is (i) logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure described herein. (FNC Resolution: Definition of "Internet", Oct. 24, 1995.) The TCP/IP network 34 is based on utilizing a hybrid or combination of CCIS with a data internetwork to link the signaling points (e.g., 14, 16, 22, 30, 24, 32) in a telecommunications network via the new hybrid common channel interoffice switching system. In this manner virtually immediate equipment, architecture, and protocol are made available in a form which is utilized and understood on a worldwide basis. In a preferred specific example, the Internet is relied upon to link signal switching points, signal transfer points, and a signal control point. The signal control point is preferably hierarchical and distributed so as to provide ample power and capacity to supply signal control for multiple telecommunications networks of related or unrelated operating companies. With such a signal control point or controller, it is feasible for each company using the controller to maintain control of its allocated portion or functionality of the common controller or control point without interfering with the accessibility of all or predesignated portions of the control point or controller to all users of the internetwork. Additional details regarding use of the TCP/IP network 34 for signaling communications are disclosed in commonly assigned, copending application Ser. No. 08/753,198, filed Nov. 21, 1996, entitled "Telecommunications System With Wide Area Internetwork Control", the disclosure of which is incorporated in its entirety herein by reference.

Voice Mail System Overview

Figure 2:
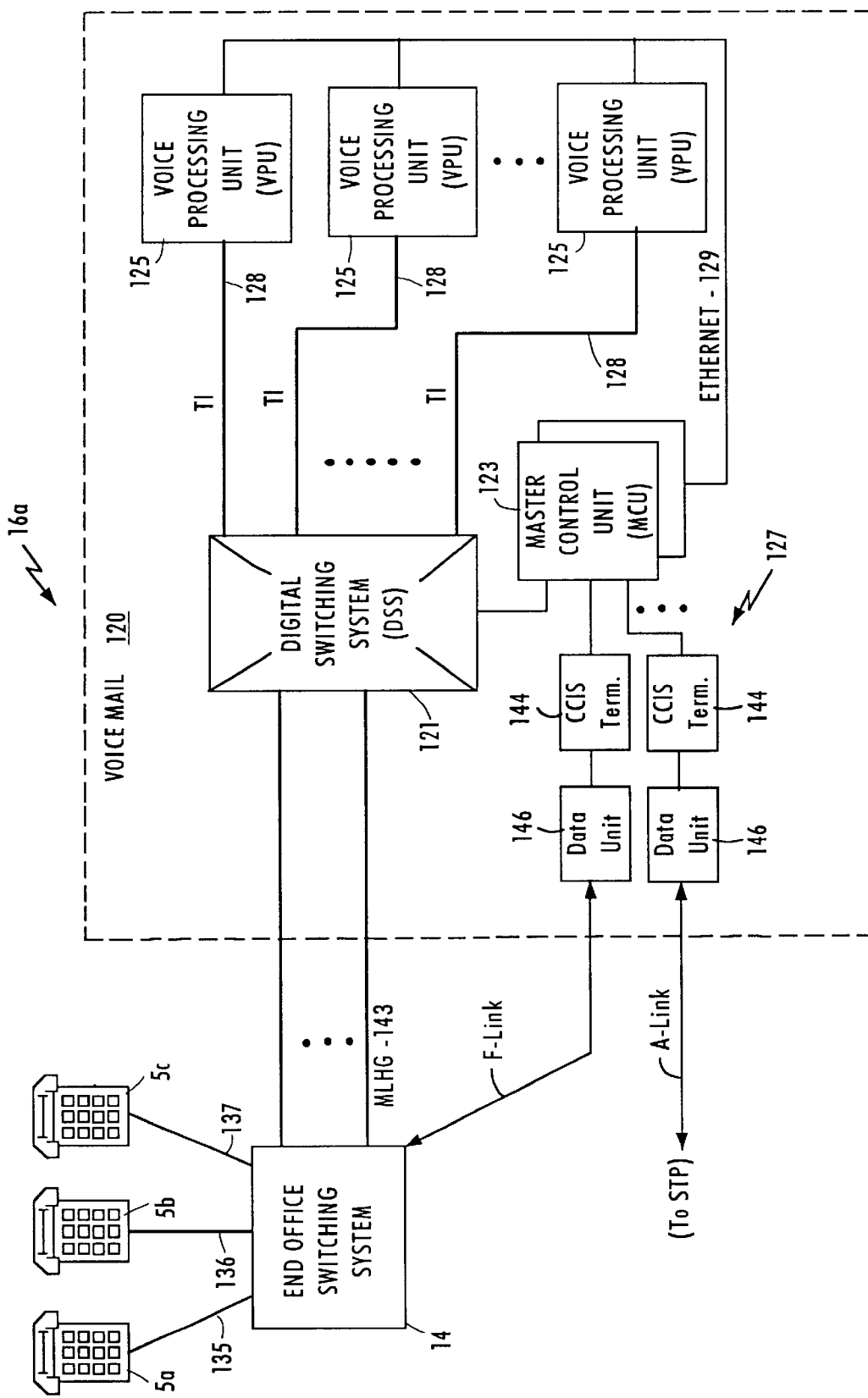
FIG. 2 is a block diagram illustrating in detail the originating voice mail system of FIG. 1.

FIG. 2 is a block diagram showing in detail the voice mail system (VMS) 16a of FIG. 1 according to an embodiment of the present invention. The VMS 16a comprises voice messaging equipment such as a voice mail system 120. Although referred to as "voice" messaging equipment, equipment 120 may have the capability of storing recorded messages of a variety of different types as well as voice messages. For example, a single system 120 may receive incoming messages in the form of audible messages, such as voice messages, as well as text format data messages. The voice messaging equipment 120 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 120 includes a digital switching system (DSS) 121, a master control unit (MCU) 123, a number of voice processing units (VPUs) 125 and an SS7 signaling interface 127, described below. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. To adapt the system 120 to receive information other than voice and/or offer services other than voice mail, one or more of VPUs 125 might be reprogrammed to run other types of applications and/or process other types of incoming information. For example, one such unit might process facsimile information, one might process E-mail, etc.

An ETHERNET or IEEE 802.3 type digital data network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 also includes an SS7 signaling interface 127 enabling generation and transmission of TCAP query messages, as well as reception of SS7 signaling messages from the end office switching system 110 or any other SS7 signaling node. The voice mail system SS7 signaling interface 127 includes a CCIS terminal 144 and an associated data unit 146 that provides an SS7 signaling link between the master control unit 123 and a selected signaling node on the SS7 network, for example the ADAS 30, the remote directory database 32, the STP 22, the SCP 24, or another SS7-capable VMS. Although two such links are shown, preferably there are a plurality of such links providing redundant connections to STPs of a mated pair and/or an end office switching system 14. These links provide sufficient capacity to carry all necessary signaling to and from the particular voice mail system 120.

The SS7 signaling through the CCIS terminal 146, the data unit 144 and the selected signaling node provides two-way signaling data transport for call set-up related messages to and from other offices for receiving a message (live or recorded) for storage in the voice mail system 120, two-way data transport of messages related to identifying a destination telephone number using speech recognition, or transmitting a recorded message to another voice mail system, described below. These call set-up related messages typically utilize the ISDN-UP (ISDN-users part) protocol portion of SS7. The SS7 signaling through the terminal 146, the data unit 144 and the STPs also provides two-way signaling data transport for communications between the VMS 120 and SPs storing subscriber profiles, such as End offices and ISTPs, described below. The communications between the VMS 120 and the database systems in the SPs utilize the TCAP (transactions capabilities applications part) protocol portion of SS7.

In various operations discussed in more detail below, calls can be forwarded to the voice mail system 120 in response to calls to subscriber's lines 135, 136, or 137 received by end office switching system 14 and that subscribe to voice mail capabilities. The switching system 14 may also route some calls directly to the voice mail system 120 in response to callers 5a, 5b, or 5c dialing a telephone number assigned to the lines 143 going to the voice mail system 120. When the end office switching system 14 directs a call to the voice mail system 120, either as a forwarded call (busy or no answer) or as a direct call in response to dialing of a number for accessing the system 120, the switching system places the call on any available channel on the multi-line hunt group (MLHG) lines 143. Although FIG. 2 shows only a single end office connected to the VMS 120, the VMS 120 may be connected to a plurality of end offices 120 via respective MLHG lines.

According to the disclosed embodiment, when the end office switching system 14 forwards a call to the voice mail system 120, the switching system 14 will also provide various data relating to the call via an F link of the SS7 network. In particular, the switching system 14 transmits an SS7 data packet to the data unit 146 indicating which line of the multi-line hunt group 143, i.e. which T1 trunk and which DO channel on the trunk, that the new call will come in on. The SS7 data packet also identifies the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The data unit 146 forwards the SS7 data packet to the CCIS terminal 144, which extracts the message data from the SS7 packet and forwards the message data to the MCU 123. The master control unit 123 uses the multi-line hunt group line information and the subscriber's directory number to internally route the forwarded call though DSS switch 121 and one of the internal T1 links 128 to an available voice processing unit 125 and identifies the relevant subscriber to that voice processing unit via the Ethernet 125.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data received by the SS7 signaling network, as described above. An SS7 packet received by one of the data units 146 is decoded, and the corresponding information is forwarded by the CCIS terminal 144 to the MCU 123. If all 24 DO channels within the T1 to the "home" voice processing unit 125 are engaged, the central processing unit 123 controls switch 121 to route the call to another voice processing unit 125 which is currently available.

The TCAP protocol provides standardized formats for various query and response messages. Each query and response includes data fields for a variety of different pieces of information relating to the current call. For example, an initial TCAP query from an SSP includes among other data a "Service Key," such as the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits. In accord with the invention, the MCU 123 is also capable of generating TCAP query messages, particularly to obtain routine information for transmitting a voice mail message to a remote VMS, as described below.

Voice Mail Messaging Operations

Figure 3:
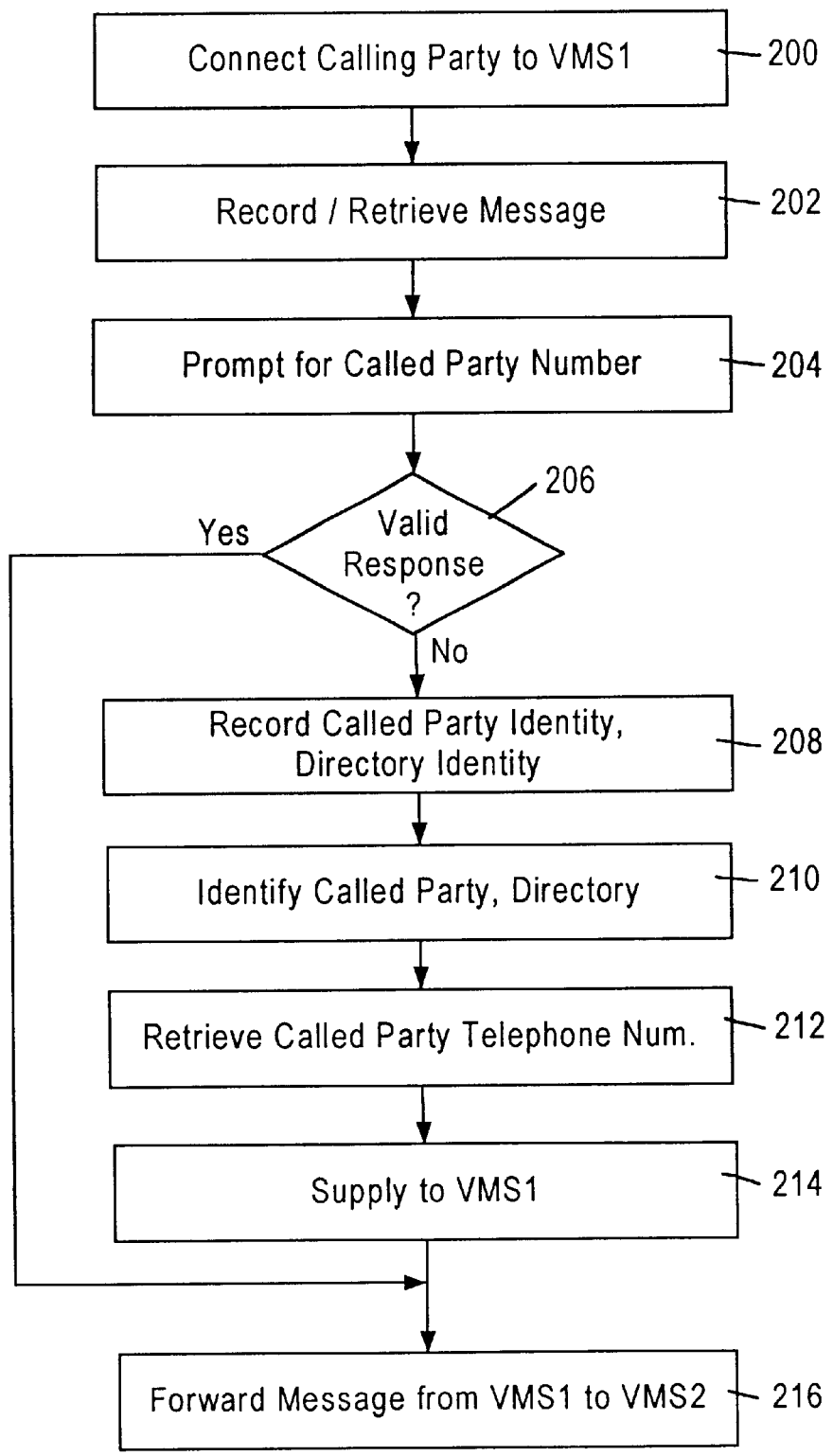
FIG. 3 is a flow diagram illustrating the method for forwarding a voice mail message using speech recognition to identify a destination telephone number according to an embodiment of the present invention.

FIG. 3 is a flow diagram illustrating a method for transmitting a voice mail message from an originating voice mail system to a destination voice mail system according to an embodiment of the present invention. The process usually begins by a subscriber of the originating voice mail system (i.e., the calling party) dialing the originating voice mail system 16a in order to record a message to be transmitted to a destination voice mail system 16b.

For example, a subscriber associated with VMSI of FIG. 1 desiring to leave a voice message in the mailbox of a remote subscriber, such as the subscriber associated with VMS2, may use a telephone station to be connected to his own voice mailbox in the voice mail system VMSI in step 200. This may be accomplished by dialing a number associated with the voice mail system VMS1 for this purpose. The voice processing unit 125 of the voice mail system may operate its voice menu to direct the caller to record a message and depress a specified key when satisfied with the message in a known fashion. The voice processing unit 125 of VMS1 thus records the message in step 202 in response to the caller inputs using the specified keys. Alternatively, the VPU 125 may replay a previously recorded message that the caller wishes to forward. It may then play a prompt to query the caller as to whether he or she desires to send the message and, if so, to depress another specified key. The voice processing unit 125 then will play a prompt in step 204 instructing the caller as to the procedure for keying in the identity of the destination and to depress a further specified key to send the message. If the user keys in a destination telephone number, the voice processing unit 125 of VMS1 then will store the identity of the destination.

Most voice mail systems include a time out feature, where the user is expected to key in the called party telephone number for the identity of the destination, followed by a key to send the message. As described above with respect to prior art voice mail systems, this conventional arrangement may be inconvenient for a calling party who does not recall the called party telephone number, nor has ready access to the called party telephone number. Hence, if a subscriber attempted to put the voice processing unit 125 on hold while attempting to retrieve the called party telephone number from a conventional directory assistance system, there is a risk that the voice processing unit 125 will "time-out" and disconnect the subscriber if an acceptable entry is not keyed in within a prescribed period of time.

According to the disclosed embodiment, the voice processing unit 125 includes a routine that enables access to the automated directory assistance system 30 of FIG. 1 via a link. In particular, if the VPU 125 does not receive a valid response within a prescribed interval in step 206, the VPU 125 initiates a routine for recording the called party identity that specifies a destination party for the recorded message in step 208. In particular, the voice mail subscriber (i.e., calling party) is prompted to speak the name of the called party identity. Once the called party identity has been recorded, then a directory identifier for the called party identity may also be requested, for example by prompting the calling party with the prompt "what city" for a geographic directory, or alternately "what company directory" for access to different corporate directories. As described below, the recording in step 208 of the called party identity and optionally the directory identifier may be performed by the voice processing unit 125 of the voice mail system 120, or alternately by the VRU 34 in the ADAS 30. As described below, if the recorded called party identity and directory identity is obtained by the VPU 125 of the voice mail system 120, the recorded information is then forwarded to the ADAS 30, either by a line-sided connection between the voice mail system 16a and the ADAS 30, or alternately by a data link via the CCIS 12 or the TCP/IP data network 34.

The recorded called party identity and optionally the directory identifier are then supplied to the voice recognition unit in the ADAS 30. As described above, the recorded called party identity and directory identifier may be supplied to the speech recognition unit 38 from the VRU 34 via the local data network 39 for line-sided transfers, or from the interface 42 for data transfers by the common channel interoffice signaling network 12 or the data network 34. In either case, the local data network 39 (e.g., Ethernet) transfers the recorded called party identity and the recorded directory identifier to the speech recognition unit 38 for speech recognition. The speech recognition unit 38 then identifies the recorded called party identity and the directory identifier in step 210 using known speech recognition techniques. For example, the recorded speech (e.g., called party identity or directory identifier) can be analyzed by a word-recognizer process or a phoneme-recognizer process. The word-recognizer process produces a list of three or more word candidates, with confidence or probability figures, referred to as W-scores. The probability figure indicates the probability that a particular choice of a candidate word is correct. If the first word candidate from the word-recognizer has a probability value which is above some chosen threshold, then the process is terminated and the word candidate is chosen for processing with the remainder of the directory inquiry. However, if the candidate word does not have a sufficiently high probability value above the prescribed threshold, then the second phoneme-recognizer process is used.

Specifically, each candidate word is linked to a set of one or more "standard" phoneme strings, which have been stored in a reference file, in alphabetic (ASCII) form. This set of standard phoneme strings is produced using one, or possibly two, methods. The first method produces precisely one string, referred to as the "phoneme label string" for the referenced candidate word, and is derived from the spelling of the word. The second method produces one or more phoneme strings, using experimental utterances by a panel of typical speakers. There may be two or more of such strings, as different pronunciations may have been found in the relevant demographic community. The second method is appropriate for an application where there is a limited number of names, for example cities. Additional details regarding word recognition for use in automated directory assistance systems may be found in the above-incorporated U.S. Pat. No. 5,638,425 to Meador, III et al., and U.S. Pat. No. 5,553,119 to McAllister et al.

Following the identification of the recorded called party identity and/or the directory identifier by the speech-recognition unit 38, the called party telephone number is retrieved in step 212 from the appropriate directory database, described below, and the retrieved called party telephone number is then supplied to the voice mail system 16a in step 214. Once the voice mail system 16a has received the called party telephone number, the voice mail system 16 may forward the message in step 216 to the destination voice mail system (VMS2) 16b, described in detail below.

Hence, the voice mail system 16 enables the voice mail subscriber (i.e., the calling party) to access the ADAS 30 as part of the session with the voice processing unit 125. If the voice processing unit 125 determines in step 206 that no valid response is received by the calling party, the VMS 16 is configured for initiating a link with the ADAS 30 in order to obtain the called party telephone number.

Figure 4A:
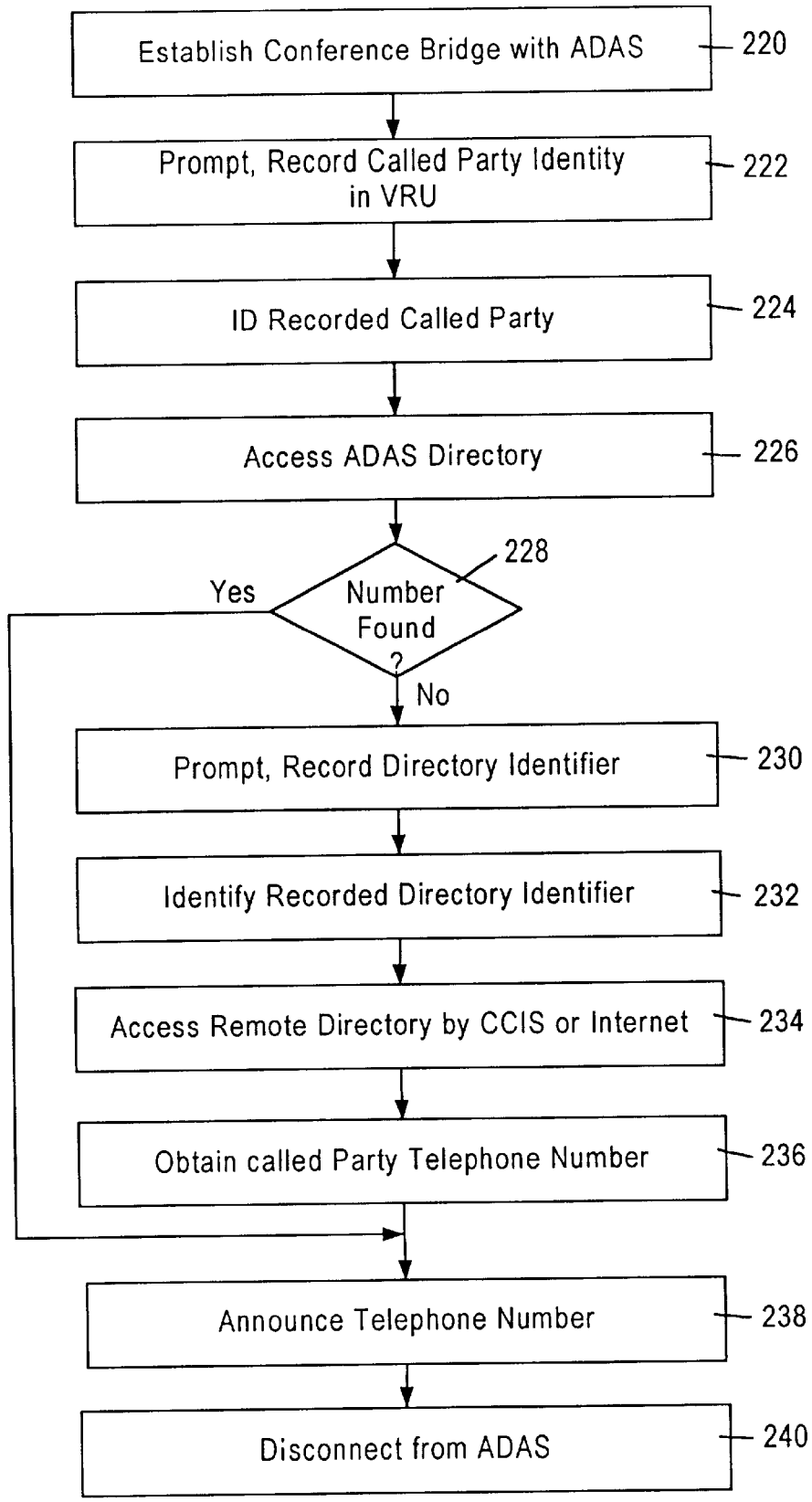
FIGS. 4A, 4B and 4C are flow diagrams illustrating alternative arrangements for obtaining the called party telephone number for transmission of the voice mail message according to embodiments of the present invention.
Figure 4B:
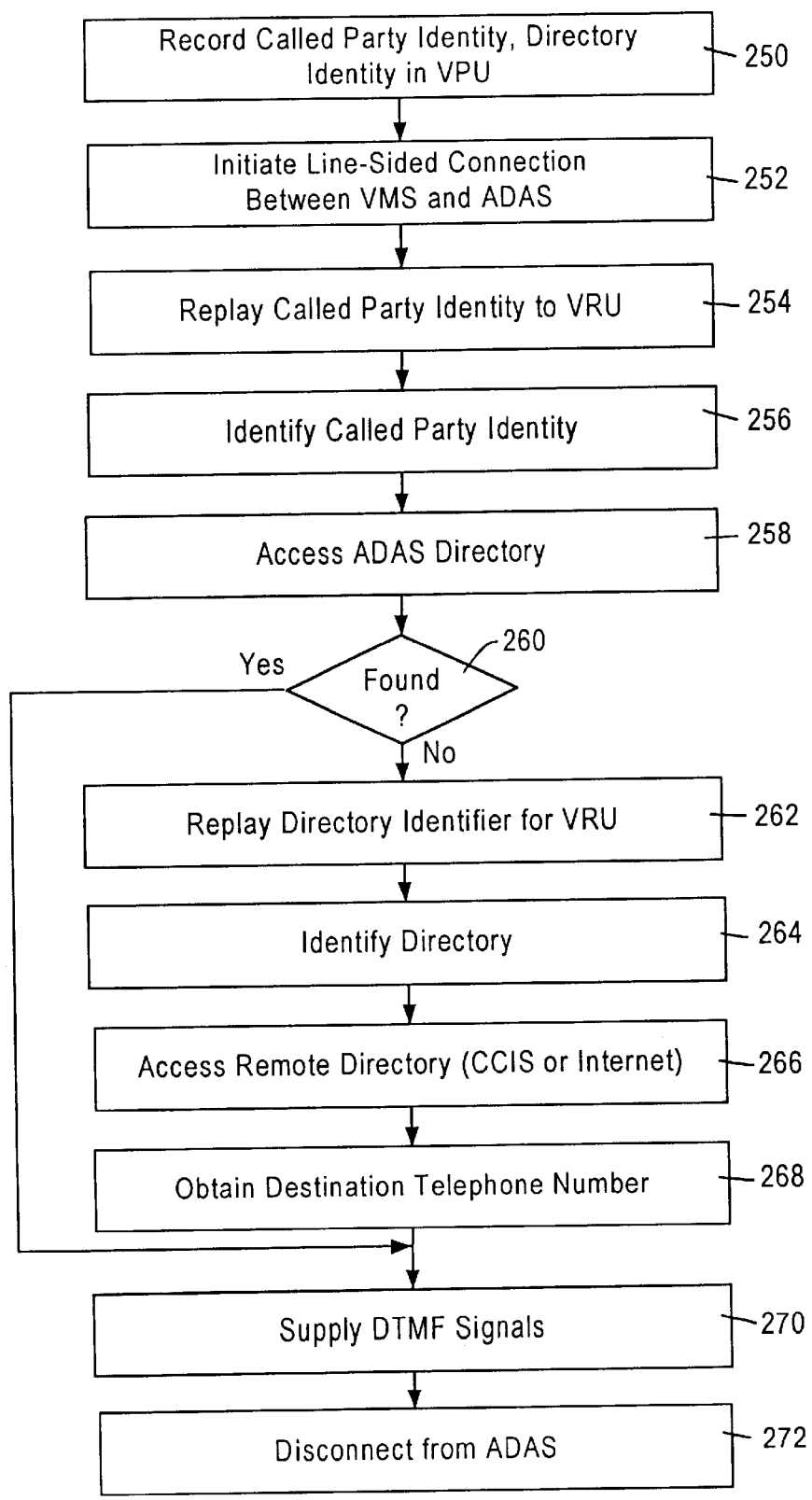

The nature of the data link, as well as the associated protocol between the VMS 16 and the ADAS 30 in retrieving a called party telephone number will depend upon the relative capabilities of the voice mail system 16 and the ADAS 30. According to one embodiment described with respect to FIG. 4A, the VMS 16a and the ADAS 30 exchange information via line-sided connections, where the switch 14a establishes a bridge connection between the calling party 5, the originating voice mail system 16a, and the voice response unit 34 of the ADAS 30. The arrangement of FIG. 4A is particularly effective for existing voice mail and directory assistance systems that may have limited signaling and communications abilities. Hence, the use of line-sided connections enables the feature of accessing ADAS 30 to retrieve a called party telephone number to be implemented in existing public switched telephone networks with minimal modification to the infrastructure or the existing voice mail or directory assistance systems. FIG. 4B is a variation of FIG. 4A in that the VMS 16 is configured for initiating a line-sided connection with the ADAS 30 that is separate from the line-sided connection with the calling party 5.

Figure 4C:
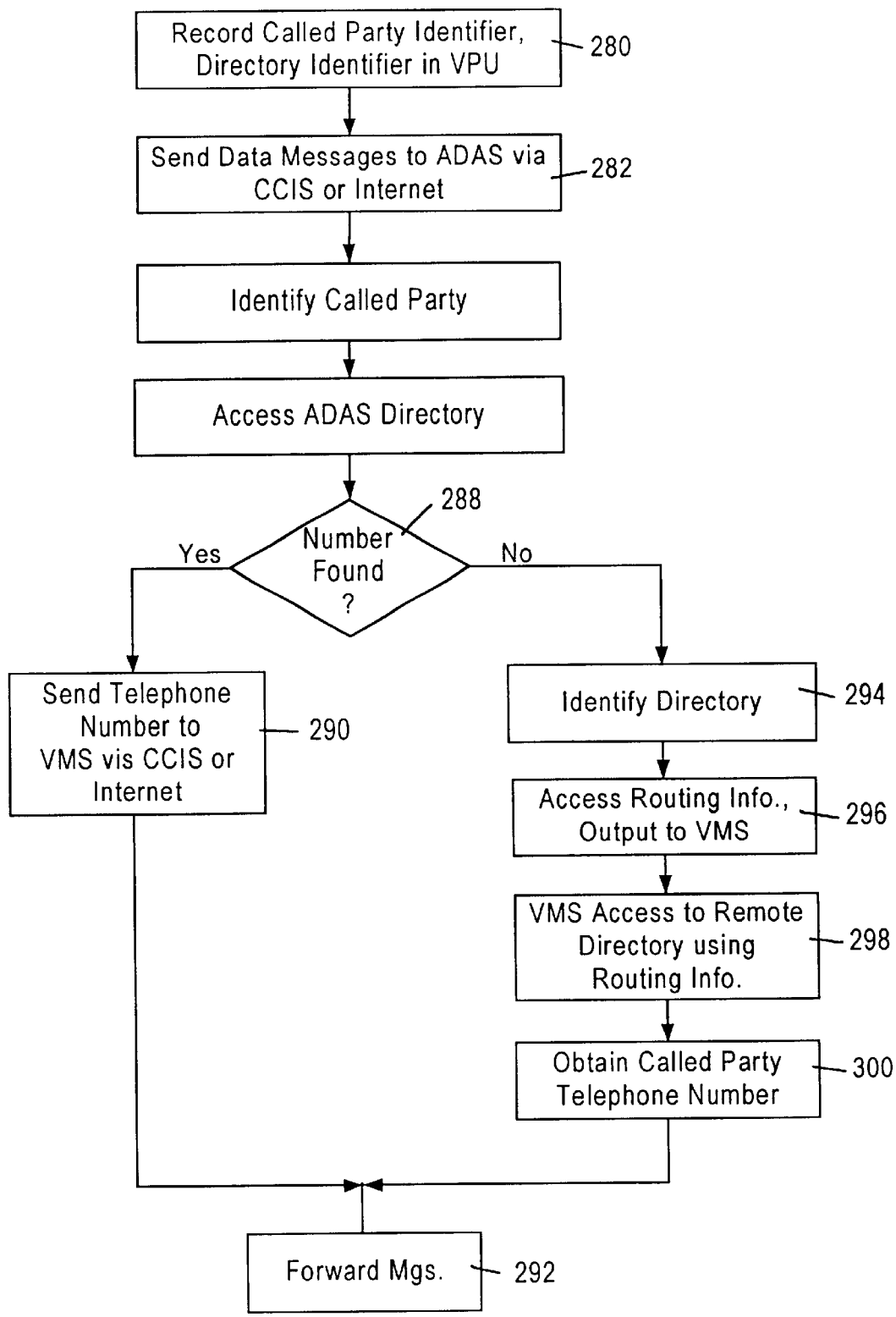

FIG. 4C illustrates an alternate implementation for retrieving the called party telephone number, where the VMS 16 and the ADAS 30 are configured for two-way communication of data messages according to TCAP protocol using the CCIS network 12, or alternatively TCP/IP protocol using the TCP/IP network 34. As described below, the arrangement of FIG. 4C eliminates the necessity of line-sided connections, and enhances the capabilities of the VMS 16 in directly accessing remote directory databases 32 for called party telephone numbers that are not local to the directory database 40.

A description will now be given of use of line-sided connections between the VMS 16 and the ADAS 30 to obtain a called party telephone number. As shown in FIG. 4A, the link is established between the VMS 16 and the ADAS 30 by the switch 14, which establishes a conference bridge between the VMS 16 and the ADAS 30 in step 220. In particular, the voice processing unit 125, upon recognizing that the calling party is unable to key in digits for the called party, sends a message to the master control unit 123 requesting a conference bridge to the ADAS 30. The MCU 123 sends a signaling message to the end office 14 via the associated signaling channels, requesting the conference bridge between the subscriber 5, the VPU 125, and the ADAS 30. The cross-connect switch 30 of the ADAS 30 connects the incoming line-sided connection to one of the voice response units 34.

The VRU 34 then prompts the voice mail subscriber to speak the name of the called party identity in step 222, and records the called party identify spoken by the calling party. As shown in FIG. 4A, the VRU at this point only requests the called party identity. The VRU 34 then supplies the recorded called party identity to the speech recognition unit 38 via the local data network 39 for speech recognition. The speech recognition unit 38 uses the above-described speech recognition techniques to identify the recorded called party identity in step 224 as a recognized name, for example John Smith.

Once the speech recognition unit 38 has identified the called party as a specific destination party for the recorded message, the controller 36 then accesses the local ADAS directory database 40 in step 226 to determine whether the destination party "John Smith" identified by the speech recognition unit 38 has a corresponding stored telephone number in the directory database 40. If in step 228 a valid called party number is found for the destination party (i.e., the called number), then the retrieved called party number can be used to transmit the recorded message to a destination voice mail system, as described below.

Assuming that no called party number was found in the ADAS directory database 40, the controller 36 then sends a message to the VRU 34 that the number was not found. The VRU 34 then prompts the voice mail subscriber in step 230 for a directory identifier to locate the destination party, for example a city, a business directory, or an alternate telecommunications directory managed by an interexchange carrier or a competing local exchange carrier (CLEC). The VRU 34 records the directory identifier corresponding to the destination party from the calling party, and forwards the recorded directory identifier to the speech recognition unit 38. The speech recognition unit 38 then identifies the recorded directory identifier in step 232, and then accesses the database 41 for routing information for communication with remote directory databases, for example the remote directory database 32 of FIG. 1. Alternatively, the ADAS 30 may output a TCAP query message to the SCP 24, or some alternate database in the CCIS network 12, to obtain the routing information for the appropriate remote directory database.

Once the routing information for the identified directory has been found by the controller 36, the ADAS 30 accesses the remote directory database 32 by the common channel interoffice signaling network 12, or alternatively by the Internet or other data network 34 in step 234. In the case of CCIS signaling, the ADAS 30 outputs a TCAP query message to the remote directory database 32. The TCAP query message would relate to a request for user profile information stored in the disk storage database 32, including the identified destination party, and including a request for the destination telephone number, also referred to as the called party number. The remote directory database 32 consults the profile information in its database to establish the existence and identity of the destination party, the called number, and the corresponding mailbox for the called number. However, if a mailbox is not found, then the remote directory database in step 236 merely sends back the called party telephone number to the ADAS 30.

Once the ADAS 30 receives the TCAP response message from the remote directory database 32, the VRU 34 announces the called party telephone number in step 238 to the calling party 5 via the conference bridge. The ADAS 30 then disconnects itself from the conference bridge in step 240 following announcement of the telephone number, enabling the subscriber 5 to key in the destination number for the VPU 125.

The arrangement of FIG. 4A is particularly beneficial for voice mail systems and automated directory assistance systems, for example intelligent peripherals, that have limited signaling capability with respect to establishing a signaling link between each other. Hence, the arrangement of FIG. 4A enables a voice mail system to obtain forwarding number information using line-sided connections with the ADAS 30. Hence, the subscriber 5 can obtain the telephone number from the VRU 34 while remaining connected to the VPU 125 via the bridge. The subscriber can thus obtain the number and manually key in the number without initiating a separate connection with the ADAS 30, which normally would risk disconnection with the VMS 16a. As such, the VMS 16 is programmed to not drop the connection during the bridge connection.

FIG. 4B is a flow diagram illustrating a variation of the arrangement in FIG. 4A of using a line-sided connection to obtain called party telephone numbers for a voice mail system. As shown in FIG. 4B, the voice processing unit 125 of the voice mail system 16a, upon detecting no valid key response by the user in step 206, prompts for and records speech signals for both the called party identifier, and the directory identifier (i.e., the directory index information) in step 250. Hence, the recording step is performed in the voice mail system 16, as opposed to the arrangement of FIG. 4A that performs the recording steps in the VRU of the ADAS 30. Once the voice mail system 16 has recorded the called party identifier and the directory identifier, the voice mail system 120 announces that the subscriber may hang up, if desired, or wait for confirmation of the message transfer. The VMS 120 then initiates a separate line-sided connection in step 252 with the ADAS 30. Once the line-sided connection has been established between the VMS 16 and the ADAS 30, the VPU 125 replays the recorded called party identity to the VRU 34 in step 254. The VRU 34 then passes the replayed called party identity to the speech recognition unit 38, and the speech recognition unit 38 identifies the called party identity in step 256. The directory database 40 is then accessed in step 258, similar to step 226 above. If the called party number is not found in step 260, then the VRU 34 sends a signal causing the VPU 125 to replay the directory identifier. The VPU 125 in response replays the directory identifier for the VRU 34 in step 262, and the speech recognition unit 38 identifies the replayed directory in step 264. The controller 36 then accesses the database 41 to obtain the routing information for the identified directory in step 266, and sends the appropriate query message to the remote directory database 32 via the CCIS 12 or the data network 34 to obtain the called party telephone number in step 268. As recognized from the foregoing, steps 266 and 268 correspond to the above-described steps 234 and 236, respectively.

Once the telephone number corresponding to the destination party has been retrieved by the ADAS 30, either by the local database 40 or the remote database 32, the voice response unit 34 supplies the retrieved telephone number in step 270, for example by outputting DTMF signals recognizable by the VPU 125. The ADAS 30 then disconnects in step 272, enabling the voice mail system 16a to initiate mailbox-to-mailbox transfer using the telephone number supplied by the ADAS 30, as described below.

FIG. 4C is a flow diagram illustrating an alternative implementation for obtaining the destination telephone number for the destination party, where the VMS 16 and the ADAS 30 are configured for communicating between each other across a data link, for example the CCIS network 12, or the packet switched TCP/IP network 34. The arrangement in FIG. 4C is particularly advantageous in providing a seamless approach for the voice mail subscriber in obtaining the destination telephone number for the mailbox-to-mailbox transfer.

As shown in FIG. 4C, the VPU 125 in the voice mail system 16 records the spoken called party identifier and directory identifier in step 280 in response to detecting that a valid response was not keyed in in step 206 of FIG. 3. The VPU 125 then announces that the subscriber may hang up, perform another operation, or wait for confirmation that the message was successfully transferred. The VPU 125 then digitizes the recorded called party identifier and directory identifier as digital speech samples, and forwards the digital speech samples to the MCU 123, along with a request for a search for a destination telephone number for the destination party. The MCU 123 formulates a TCAP query message, or alternatively, a TCP/IP format message, and forwards the query message via the data terminal 144 and data unit 146 to the ADAS 30 via the CCIS network 12, or alternatively the TCP/IP network 34 (step 282). The TCAP query message would also include information specifying that the calling station is requesting mailbox-to-mailbox message transfer. The interface 42 of the ADAS 30, upon receiving the messages from the VMS 16, sends the received data messages to the controller 36. The controller 36 decodes the received messages, and determines that the received messages are for retrieval of a telephone number for a recorded called party identity. The controller 36 forwards the digitized speech samples to the speech recognition unit 38, along with the speech samples associated with the directory identifier. The speech recognition unit 38 identifies the called party in step 284, and the controller 36 then uses the identified called party to access the ADAS directory database 40 in step 286. If the controller 36 determines that in step 288 the directory database 40 stores a stored telephone number for the destination party, the controller 36 then sends a TCAP response message (or a TCP/IP data message, as appropriate), in step 290 with the called party telephone number via the CCIS 12 or the data network 34, enabling the VMS 16 to forward the message in step 292.

However, if in step 288 the controller 36 determines that the ADAS directory database 40 does not store the telephone number for the destination party, then the speech recognition unit 38 identifies the corresponding directory identified from the supplied speech samples in step 294. As described above, the identified directory may identify a remote geographic location, or alternatively a directory for an interexchange carrier, for example AT&T, MCI, etc. The directory identifier may alternatively specify a corporate directory, for example a large company that allows limited access to its directory databases for obtaining the telephone numbers of certain employees.

The controller 36, upon identifying the directory identity, accesses the routing information from the database 41, and returns the routing information pointing to the specific remote directory database back to the VMS 16 by the CCIS network 12 or the TCP/IP network 34. Alternatively, the ADAS 30 may output a TCAP query message to the SCP 24 to obtain the routing information. The ADAS 30 may also supply the VMS 16 with a data representation of the identified destination party, enabling a remote database that lacks speech recognition capabilities to utilize the data (e.g., ASCII-based data) to identify the destination party.

The VMS 16, upon receiving the routing information and optionally the data identifying the destination party, uses the routing information in step 298 to access the remote directory 32. In particular, the VMS 16 outputs a TCAP query message to the remote directory database 32 based on the routing information supplied by the ADAS 30. The remote directory database 32, upon receiving the TCAP-formatted or TCP/IP-formatted message from the VMS 16, accesses its internal records, based on the supplied destination party information, and outputs a response message that includes the called party telephone number to the VMS1 16a, plus the voice mail capabilities information, described above. For example, the response message also specifies the existence of a voice mail system for the called party (i.e., called party capabilities information), whether the voice mail system of the called party has SS7 capabilities (i.e., destination voice mail system capabilities), along with the appropriate routing label enabling the originating node to establish a line-sided connection with the destination voice mail system.

Once the VMS 16 obtains the called party telephone information in step 300, the VMS 16 can initiate the mailbox-to-mailbox transfer in step 292.

Mailbox-to-Mailbox Transfer

The originating voice mail system VMS1 can now begin the transfer process. If the MCU 123 recognizes the destination number as having a mailbox in the same voice mail system 16a, the MCU 123 merely performs an internal transfer within the VMS 16a. For intersystem transfers (e.g., VMS1 to VMS2) however, the VMS1 needs to obtain routing information for transmission of the recorded message.

Specifically, the MCU 123 of the originating voice mail system VMS1 generates a destination point code (DPC) based on the called number received by the voice processing unit 125 of the originating voice mail system VMS1. The master control unit 123 then formulates and outputs a TCAP query message to the SS7 node specified by the destination point code. As described above, the destination point code may correspond to a central office serving the called party, or an ISTP storing call processing records for the called party. The VMS1 transmits the TCAP query through the SS7 network to the facility corresponding to the destination point code.

The TCAP message includes information identifying the calling station and mailbox, the called station and the fact that the caller is requesting mailbox-to-mailbox message transfer. The destination facility (i.e., the serving CO or the serving ISTP) accesses its stored subscriber records to establish the existence and identity of a mailbox for the called number. If the identity of such a mailbox is found, the destination facility formulates the appropriate response to the TCAP query message (e.g., by setting a flag bit in the response). If the called number does not have voice mail capabilities, the appropriate flag indicating voice mail capabilities is not set. The facility transmits the TCAP response back through the SS7 network to the VMS1.

The MCU 123 of the originating voice mail system VMS1 receives the TCAP response, and processes the TCAP response by first determining whether the called party is a voice mail subscriber. Assuming the called party is not a voice mail subscriber, the VMS 16a may initiate a line-sided connection to the destination party, and begin playback a predetermined time after detecting silence following an off-hook condition (e.g., after a user says "hello" or an answering machine has finished playing a greeting).

Assuming the called party is a VMS subscriber, the MCU 123 obtains the telephone number of the corresponding MLHG from the TCAP response message, and places a line-sided call to the MLHG of the destination voice mail system. The MCU 123 also checks the TCAP response to determine whether the destination voice mail system has SS7 capabilities. Assuming the TCAP query message includes a flag indicating the destination voice mail system has SS7 signaling capabilities (e.g., VMS3 of FIG. 1), the MCU 123 sends SS7 signaling information including the called party number using the translated destination point code supplied in the TCAP response. The destination voice mail system having SS7 capabilities (e.g., VMS3) is able to identify the appropriate subscriber for the incoming call on the multi-line hunt group based on the received SS7 signaling information. The destination voice mail system can thus access any subscriber specific information, including a personalized greeting.

Assuming that the TCAP response message indicates that the destination voice mail system does not have SS7 capabilities, the originating voice mail system 16a generates DTMF signals for the called party in response to an off-hook condition on the multi-line hunt group of the destination voice mail system. Hence, the originating voice mail system is configured to enter the called party information in order to enable the destination voice mail system to identify the called party without use of the SMDI link.

Once the destination voice mail system prompts for initiation of the message, usually by sounding a beep, the originating voice mail system begins playback of the message. Additional details regarding mailbox transfers are discussed in the above-incorporated application "Voice Mail System for Obtaining Routing Information from Signaling Nodes" Ser. No. 08/997,538.

According to the disclosed embodiment, an originating voice mail message having a recorded message to transfer is configured for establishing a link with an automated directory assistance system. Hence, a voice mail subscriber can speak a destination party identity to obtain the corresponding telephone number, without risk of being disconnected.

Although the disclosed embodiment describes an SS7-capable voice mail system initiating a line-sided connection with a destination voice mail system, the scope of the present invention encompasses various modifications, for example transferring the voice messages between voice mail systems via the SS7 network as described in the above-incorporated Bartholomew et al. patent.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A voice mail system comprising:

a voice processing unit with a memory storing a recorded message, the voice processing unit being configured for receiving a called party identity spoken by a calling party for the recorded message; and a master control unit configured for initiating a called party telephone number query routine in response to reception of the called party identity, the called party telephone number query routine when initiated causing the master control unit to establish a link through a network to a separate automated directory assistance system and supply the called party identity to the automated directory assistance system via the link through the network, wherein the master control unit is configured for receiving a called party telephone number from the automated directory assistance system and in response using the received called party telephone number to initiate a transfer of the recorded message to a destination associated with the called party.

2. A voice mail system comprising:

a voice processing unit configured for recording a called party identity, spoken by calling party, for a recorded message;

a master control unit configured for initiating a called party telephone number query routine in response to reception of the called party identity, the master control unit configured for establishing a link with an automated directory assistance system and supplying the called party identity to the automated directory assistance system, the master control unit configured for receiving the called party telephone number from the automated directory assistance system and in response using the called party telephone number to initiate a transfer of the recorded message; and a signaling network interface for sending the called party identity to the automated directory assistance system, and receiving the called party telephone number from the automated directory assistance system, via an inter-office signaling network configured for exchanging data between the voice mail system and the automated directory assistance system.

3. A voice mail system comprising:

a voice processing unit configured for recording a called party identity, spoken by calling party, for a recorded message;

a master control unit configured for initiating a called party telephone number query routine in response to reception of the called party identity, the master control unit configured for establishing a link with an automated directory assistance system and supplying the called party identity to the automated directory assistance system, the master control unit configured for receiving the called party telephone number from the automated directory assistance system and in response using the called party telephone number to initiate a transfer of the recorded message;

a signaling network interface for sending the called party identity to the automated directory assistance system, and receiving the called party telephone number from the automated directory assistance system, via an inter-office signaling network configured for exchanging data between the voice mail system and the automated directory assistance system; and a digital switching system for switching calls between an assigned Multi-Line Hunt Group and a plurality of the voice processing units, the master control unit causing the digital switching system to establish a line-sided connection on one line of the Multi-Line Hunt Group to an assigned switching office for initiating a connection with a destination voice mail system.

4. The voice mail system of claim 3, wherein the digital switching system sends DTMF signals related to the called party telephone number in response to a prompt on the line-sided connection from the destination voice mail system and determined capabilities of the destination voice mail system.

5. The voice mail system of claim 4, wherein the voice processing unit replays the recorded message on the line-sided connection a predetermined time after receiving a voice mail recording prompt.

6. A voice mail system comprising:

a voice processing unit configured for recording a called party identity, spoken by calling party, for a recorded message; and a master control unit configured for initiating a called party telephone number query routine in response to reception of the called party identity, the master control unit configured for establishing a link with an automated directory assistance system and supplying the called party identity to the automated directory assistance system, the master control unit configured for receiving the called party telephone number from the automated directory assistance system and in response using the called party telephone number to initiate a transfer of the recorded message, wherein the master control unit is configured for establishing the link with the automated directory assistance system in response to reception of corresponding routing information from an automated directory routing system.

7. The voice mail system of claim 6, wherein the voice processing unit records directory index information corresponding to the called party identity and spoken by the calling party, the master control unit outputting the directory index information to the automated directory routing system for reception of the routing information.

8. A telecommunications network comprising:

a central office switching system configured for receiving a line-sided connection with a calling party;

an automated directory assistance system comprising a speech recognition unit for identifying a directory listing based on supplied speech samples, the automated directory assistance system retrieving a stored telephone number for the identified directory listing;

a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message; and a data network for transporting the speech samples and the stored telephone number between the voice mail system and the automated directory assistance system.

9. The system of claim 8, wherein the speech samples and the stored telephone number are transported via the data network as TCAP query and TCAP response messages, respectively.

10. The system of claim 8, wherein the speech samples and the stored telephone number are each transported via the data network according to TCP/IP protocol.

11. A telecommunications network comprising:
a central office switching system configured for receiving a line-sided connection with a calling party;
an automated directory assistance system comprising a speech recognition unit for identifying a directory listing based on supplied speech samples, the automated directory assistance system retrieving a stored telephone number for the identified directory listing;
a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message,
wherein the automated directory assistance system includes a voice response unit for receiving the speech samples as analog voice signals via a second line-sided co nnection, the second line-sided connection established by the central office switching system between the automated directory assistance system and the voice mail system.

12. The system of claim 11, wherein the voice response unit outputs the stored telephone number to the voice mail system via the second line-sided connection.

13. A telecommunications network comprising:
a central office switching system configure dd for receiving a line-sided connection with a calling party;
an automated directory assistance system comprising a speech recognition unit for identifying a directory listing based on supplied speech samples, the automated directory assistance system retrieving a stored telephone number for the identified directory listing; and
a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message, wherein:
the automated directory assistance system includes a voice response unit for receiving the speech samples as analog voice signals via a second line-sided connection, the second line-sided connection established by the central office switching system between the automated directory assistance system and the voice mail system, and
the voice response unit outputs the stored telephone number to the voice mail system via the second line-sided connection as DTMF signals.

14. A telecommunications network comprising:
a central office switching system configured for receiving a line-sided connection with a calling party;
an automated directory assistance system comprising a speech recognition unit for identifying a directory listing based on supplied speech samples, the automated directory assistance system retrieving a stored telephone number for the identified directory listing; and
a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message,
wherein the automated directory assistance system includes:
(a) a first database for storing a plurality of stored telephone numbers for respective directory listings; and
(b) a second database for storing routing information for respective directory index entries, the automated directory assistance system accessing the second database in response to determining an absence of the identified directory listing in the first database and based on a directory index entry recorded by the voice mail system.

15. A telecommunications network comprising:
a central office switching system configured for receiving a line-sided connection with a calling party;
an automated directory assistance system comprising a speech recognition unit for identifying a directory listing based on supplied speech samples, the automated directory assistance system retrieving a stored telephone number for the identified directory listing;
a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message,
wherein the automated directory assistance system includes:
(a) a first database for storing a plurality of stored telephone numbers for respective directory listings; and
(b) a second database for storing routing information for respective directory index entries, the automated directory assistance system accessing the second database in response to determining an absence of the identified directory listing in the first database and based on a directory index entry recorded by the voice mail system;
a second directory assistance system, addressable by the corresponding routing information, comprising a second speech recognition unit for identifying said directory listing in response to reception of said speech samples, and a directory database for outputting the stored telephone number for the identified directory listing; and
a data network for supplying the speech samples and the stored telephone number to and from the second directory assistance system, respectively, based on the routing information.

16. The system of claim 15, wherein the automated directory assistance system supplies the speech signals to, and retrieves the stored telephone number from, the second directory assistance system based on the accessed routing information for the corresponding directory index entry.

17. The system of claim 15, wherein the routing information is supplied via the data network from the automated directory assistance system to the voice mail system for the corresponding directory index entry, the voice mail system in response supplying the speech signals to, and retrieving the stored telephone number from, the second directory assistance system via the data network.

18. A telecommunications network comprising:
a central office switching system configured for receiving a line-sided connection with a calling party;
an automated directory assistance system comprising a speech recognition unit for identifying a directory listing based on supplied speech samples, the automated directory assistance system retrieving a stored telephone number for the identified directory listing;
a voice mail system configured for recording a called party identity for a recorded message from the calling party via the line-sided connection, the voice mail system supplying the speech samples to the automated directory assistance system based on the recorded called party identity and obtaining the corresponding stored telephone number for transmission of the recorded message;
a common channel interoffice signaling network for transporting signaling messages; and
a database for retrieving voice mail subscriber profile information in response to reception of a query message from the voice mail system, via the common channel interoffice signaling network, requesting identification of a destination voice mail system serving the identified directory listing corresponding to the stored telephone number.

19. The system of claim 18, wherein the voice mail system transmits the recorded message to the destination voice mail system based on the subscriber profile information retrieved from the database.

20. A method in a switched communications network, the method comprising:
connecting a calling party in a first network connection to an originating voice mail system serving the calling party and configured for storing a recorded message associated with the calling party;
receiving a called party identity spoken by the calling party, wherein the spoken called party identity relates to an intended destination party for the recorded message;
transmitting speech samples of the spoken called party identity over a second network connection to a separate automated directory assistance system;
processing the speech samples in the automated directory assistance system to identify the intended destination party;
retrieving a telephone number corresponding to the identity of the intended destination party via the automated directory assistance system; and
transmitting the recorded message to a destination voice mailbox serving the intended destination party based on the retrieved telephone number.

21. A method in a switched communications network, the method comprising:
connecting a calling party in a first connection to an originating voice mail system serving the calling party and configured for storing a recorded message associated with the calling party;
receiving a called party identity, spoken by the calling party, that specifies a destination party for the recorded message;
processing speech samples spoken by the calling party to identify the called party identity in an automated directory assistance system;
retrieving a telephone number corresponding to the destination party in response to identification thereof using a second connection between the originating voice mail system and the automated directory assistance system while maintaining the first connection, wherein the receiving step comprises:
(a) establishing the second connection in response to a prompt request received by the originating voice mail system; and
(b) recording the called party identity in a voice response unit in the automated directory assistance system; and
transmitting the recorded message to a destination voice mailbox serving the destination party based on the retrieved telephone number.

22. The method of claim 21, wherein the connection establishing step comprises establishing a bridge connection between the calling party, the originating voice mail system, and the voice response unit of the automated directory assistance system.

23. The method of claim 21, wherein the retrieving step comprises:
accessing a first database in the automated directory assistance system to determine a presence of the stored telephone number for the destination party;
if the first database does not store said stored telephone number for the destination party:
(1) recording a directory identifier corresponding to the destination party from the calling party;
(2) identifying the directory identifier by the voice response unit;
(3) accessing a second database by the automated directory assistance system via a data network based on a directory identifier; and
(4) obtaining the telephone number from the second database to the automated directory assistance system.

24. The method of claim 23, wherein the retrieving step further comprises announcing the retrieved telephone number by the voice response unit to the calling party.

25. The method of claim 21, wherein the retrieving step further comprises announcing the retrieved telephone number by the voice response unit to the calling party.

26. A method of in a switched communications network, the method comprising:
connecting a calling party in a first connection to an originating voice mail system serving the calling party and configured for storing a recorded message associated with the calling party;
receiving a called party identity, spoken by the calling party, that specifies a destination party for the recorded message, wherein the receiving step comprises recording the called party identity in the originating voice mail system;
processing speech samples spoken by the calling party to identify the called party identity in an automated directory assistance system;
retrieving a telephone number corresponding to the destination party in response to identification thereof using a second connection between the originating voice mail system and the automated directory assistance system while maintaining the first connection, wherein the retrieving step comprises:

(a) supplying the recorded called party identity to the automated directory assistance system; and (b) transmitting signals from the automated directory assistance system to the originating voice mail system that represent the retrieved telephone number; and transmitting the recorded message to a destination voice mailbox serving the destination party based on the retrieved telephone number.

27. The method of claim 26, wherein the supplying and transmitting steps output the respective recorded called party identity and the signals via line sided connections between the originating voice mail system and the automated directory assistance system.

28. The method of claim 26, wherein the supplying and transmitting steps output the respective recorded called party identity and the signals via a data network configured for sending data between the originating voice mail system and the automated directory assistance system.

29. The method of claim 28, wherein the supplying and transmitting steps each comprise outputting the respective recorded called party identity and the signals via a data network as TCAP-formatted messages.

30. The method of claim 28, wherein the supplying and transmitting steps each comprise outputting the respective recorded called party identity and the signals via a data network as TCP/IP formatted data packets.

31. A method in a switched communications network, the method comprising:

connecting a calling party in a first connection to an originating voice mail system serving the calling party and configured for storing a recorded message associated with the calling party;

receiving a called party identity, spoken by the calling party, that specifies a destination party for the recorded message;

processing speech samples spoken by the calling party to identify the called party identity in an automated directory assistance system;

retrieving a telephone number corresponding to the destination party in response to identification thereof using a second connection between the originating voice mail system and the automated directory assistance system while maintaining the first connection, wherein the retrieving step comprises accessing a first database in the automated directory assistance system to determine a presence of the stored telephone number for the destination party, and if the first database does not store said stored telephone number for the destination party:

(1) recording a directory identifier corresponding to the destination party from the calling party;

(2) identifying the directory identifier by a speech recognition unit;

(3) accessing a second database via a data network based on a directory identifier; and (4) obtaining the telephone number from the second database to the automated directory assistance system; and transmitting the recorded message to a destination voice mailbox serving the destination party based on the retrieved telephone number.

32. The method of claim 31, wherein the second database accessing step is performed by the automated directory assistance system.

33. The method of claim 31, wherein the second database accessing step is performed by the originating voice mail system.

34. A method in a switched communications network, the method comprising:

connecting a calling party in a first connection to an originating voice mail system serving the calling party and configured for storing a recorded message associated with the calling party;

receiving a called party identity, spoken by the calling party, that specifies a destination party for the recorded message;

recording a directory identifier corresponding to the destination party from the calling party;

processing speech samples spoken by the calling party to identify the called party identity in an automated directory assistance system;

identifying the recorded directory identifier by a speech recognition unit;

retrieving a telephone number corresponding to the destination party in response to identification thereof using a second connection between the originating voice mail system and the automated directory assistance system while maintaining the first connection, wherein the retrieving step comprises:

(a) accessing a database via a data network based on the identified directory identifier; and (b) supplying the telephone number retrieved from the database to the originating voice mail system via the data network; and transmitting the recorded message to a destination voice mailbox serving the destination party based on the retrieved telephone number.

35. The method of claim 34, wherein the accessing and supplying steps each comprise outputting TCAP-format messages onto the data network.

36. The method of claim 34, wherein the accessing and supplying steps each comprise outputting TCP/IP format data packets onto the data network.

37. The method of claim 34, wherein the accessing step is executed by the originating voice mail system.

38. The method of claim 34, wherein the accessing step is executed by the originating voice mail system by the automated directory assistance system.

* * * * *